United States Patent
Chen et al.

(10) Patent No.: US 10,922,314 B2
(45) Date of Patent: Feb. 16, 2021

(54) INCREMENTALLY UPDATING A DATABASE STATISTIC

(71) Applicant: HEWLETT PACKARD ENTERPRISE DEVELOPMENT LP, Houston, TX (US)

(72) Inventors: QiFan Chen, Austin, TX (US); Choudur Lakshminarayan, Austin, TX (US)

(73) Assignee: MICRO FOCUS LLC, Santa Clara, CA (US)

( * ) Notice: Subject to any disclaimer, the term of this patent is extended or adjusted under 35 U.S.C. 154(b) by 662 days.

(21) Appl. No.: 15/563,124

(22) PCT Filed: Apr. 29, 2015

(86) PCT No.: PCT/US2015/028235
§ 371 (c)(1),
(2) Date: Sep. 29, 2017

(87) PCT Pub. No.: WO2016/175788
PCT Pub. Date: Nov. 3, 2016

(65) Prior Publication Data
US 2018/0107715 A1    Apr. 19, 2018

(51) Int. Cl.
*G06F 16/2453* (2019.01)
*G06F 16/23* (2019.01)
(Continued)

(52) U.S. Cl.
CPC .... *G06F 16/24545* (2019.01); *G06F 16/2358* (2019.01); *G06F 16/2379* (2019.01); *G06F 16/2455* (2019.01); *G06F 17/18* (2013.01)

(58) Field of Classification Search
CPC ............... G06F 16/24545; G06F 17/18; G06F 16/2455; G06F 16/2358; G06F 16/2379
See application file for complete search history.

(56) References Cited

U.S. PATENT DOCUMENTS 6,311,181 B1    10/2001  Lee et al.
6,542,886 B1 *   4/2003  Chaudhuri .......... G06F 16/2462
(Continued)

FOREIGN PATENT DOCUMENTS

WO    WO-2014178851           11/2014
WO    WO2014178851 A1 *  11/2014  ......... G06F 16/2462

OTHER PUBLICATIONS

Konig, A.C. et al.; "Combining Histograms and Parametric Curve Fitting for Feedback-driven Query Result-size Estimation"; May 28, 1999;http://www.vldb.org/conf/1999/P41.pdf.
(Continued)

*Primary Examiner* — Cam Y T Truong

(57) ABSTRACT

A technique includes determining a statistic for values associated with at least one column of a database based at least in part on a first sample of the values; and determining a degree of change in a second sample of the values relative to the first sample; and estimating a count of unique values for the column(s). The estimation of the count of unique values includes selectively incrementally updating the statistic using the second sample based at least in part on the determined degree of change; and basing estimation of the count at least in part on the updated statistic. The technique further includes processing a query to the database based at least in part on the count.

15 Claims, 4 Drawing Sheets

(51) Int. Cl.
  *G06F 16/2455*  (2019.01)
  *G06F 17/18*   (2006.01)

(56) References Cited

U.S. PATENT DOCUMENTS

| | | |
|---|---|---|
| 7,162,464 B1 | 1/2007 | Miller et al. |
| 7,428,550 B2 | 9/2008 | Lakshminarayan |
| 7,496,584 B2 | 2/2009 | Rjaibi et al. |
| 7,483,873 B2 | 6/2009 | Bhattacharjee et al. |
| 7,778,996 B2 | 8/2010 | Burger |
| 7,930,296 B2 | 4/2011 | Muras |
| 2006/0218128 A1* | 9/2006 | Muras ............... G06F 16/24544 |
| 2011/0022581 A1 | 1/2011 | Korlapati |
| 2013/0198165 A1 | 8/2013 | Cheng et al. |
| 2014/0149433 A1 | 5/2014 | Lakshminarayan |

OTHER PUBLICATIONS

Poosala, V. et al; "Improved Histograms for Selectivity Estimation of Range Predicates"; Jun. 19, 1997;http://dl.acm.org/ft_gateway.cfm?id=233342&ftid=27287&dwn=1&CFID=47818.

International Searching Authority., International Search Report and Written Opinion dated Jan. 28, 2016 for PCT Application No. PCT/US2015/028235 Filed Apr. 29, 2015, 14 pgs.

Peter j. Haas et al., "Sampling-Based Estimation of the Number of Distinct Values of an Attribute", Proceedings of the 21st VLDB Conference, Zurich, Switzerland, 1995, 12 pages.

Yannis Ioannidis, "The History of Histograms (abridged)", Proceedings of the 29th Conference, Berlin, Germany 2003, 12 pages.

\* cited by examiner

INCREMENTALLY UPDATING A DATABASE STATISTIC

BACKGROUND

For purposes of enhancing the retrieval and storage of large volumes of data, the data may be organized in a database. A query may be submitted to the database for purposes of retrieving information from the database. A query contains one or more operations that specify the information that is to be retrieved.

DETAILED DESCRIPTION

Figure 1:
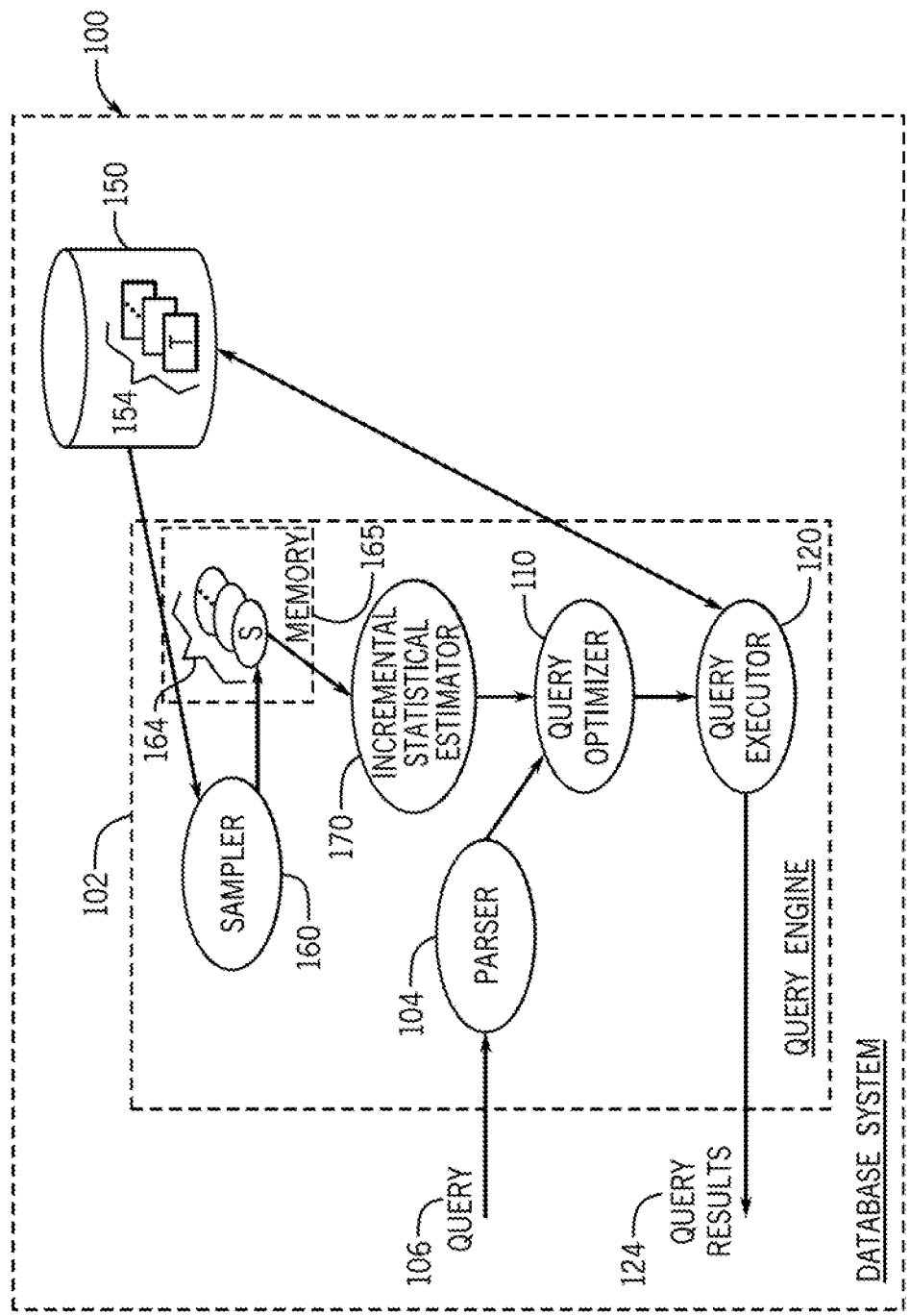
FIGS. 1 and 4 are schematic diagrams of database systems according to example implementations.

A database system, in general, may include repositories called databases, which may be accessed by users through the use of queries. One type of database is a relational database in which the data is organized in tables. In this manner, a given table may contain columns, where each column is associated with a particular key, or attribute, and contains values for the associated attribute.

The database system may contain a database management system (DBMS), which may be a software-base system, which users use to formulate queries, which target selected subsets of the stored data. For example, a given query may be directed to searching the names of employees working on projects in the oil and gas industry. To respond to such queries, the DBMS may include a query optimizer that, in response to a received query (or a compiled version of it) produces an execution plan.

This execution plan is formulated by the DBMS to optimize execution of the query and may include a tree of operators. In general, the tree of operators instructs a query executor of the DBMS regarding how to execute the query. For example, the query optimizer may select the particular operators that are used in the execution of the query and the order in which these operators are applied. As a more specific example, a given query may involve multiple join operations, and for the execution of such a query, the query optimizer may determine the order in which to join tables of the database.

The query optimizer may rely on statistics of the database to construct the query plan. For example, the number of unique values for an attribute (also called a "unique entry count," or "UEC") is one such statistic. In this manner, a given column of a database table contains values for an associated attribute (a sales volume, a revenue amount, a zip code, and so forth). A given column has a certain number of distinct, or unique, values, and one or more of these unique values may repeat in the column. For example, for the example attribute values of 2, 3, 2, 5, 6, 3, 3 and 2, there are four unique values (2, 3, 5 and 6); and some (2 and 3) of the unique values repeat more than once.

When the number of unique values for a column is unknown, the DMBS may estimate the number based on a sample of the column's values. This approach may be particularly beneficial for relatively large databases in which the cardinality (the total row count, which is the sum of the frequencies of all unique values) may be on the order of thousands to billions. Because data in the database continually changes, the sampling may be regularly updated for purposes of reflecting changes in the database content. If relatively poor estimates are made of the database statistics of the database, then the query optimizer may generate an incorrect query plan, causing long query response times and relatively low throughput.

The DBMS may use an estimator to estimate the number of unique attribute values for a column based on samples of values from the column. There are different types of estimators, with some estimators providing relatively better estimates for data that has a relatively high skew and other estimators providing relatively better estimates for data that has a relatively low skew. The "skew," or "skewness," refers to the variations in the frequencies of the attribute values: uniform data has a low skew, with corresponding nonexistent or small variations in the frequencies.

The frequencies of the attribute values refer to how often the unique values appear. For the example attribute values of 2, 3, 2, 5, 6, 3, 3, 6 and 2 that are set forth above, there are four unique values (2, 3, 5 and 6); and these unique values have the following associated respective frequencies: 3, 3, 1 and 2. In other words, the unique value "2" occurs three times, the unique value "5" occurs once, and so forth. The frequency of the frequencies may be represented by "$f_i$" herein, where $f_i$ represents the number of unique values that occur exactly "i" times. In this manner, for the example attribute values above, $f_1=1$, $f_2=1$, $f_3=2$, and all other values of $f_i$ are zero. In the following discussion, the "$f_i$ statistic" refers to a set of frequencies of unique value counts (i.e., frequencies of frequencies) for an underlying set of data (a single column or group of multiple columns, for example).

The unique value count estimator may generate an estimate of the unique value count based on a statistic (the $f_i$ statistic, for example) that is determined from a sampled dataset of attribute values. In particular, in accordance with example implementations such estimators as the Jackknife estimator, the Schlosser estimators or a linear weighted combination estimator (LWC) of the Jackknife and Schosser estimators may be used. Other estimators may be used, in accordance with further example implementations.

Because the estimation error of the estimator may be generally inversely related to the sample size, a relatively large sample of the table, in general, produces more accurate results (and therefore, correspondingly results in a better query plan). However, for practical reasons, the sample sizes may be limited (limited to no more than one million rows), regardless of the column cardinality.

In accordance with example systems and techniques that are disclosed herein, a statistic for a database is incrementally updated using potentially multiple sampled datasets, if the data distribution is determined to have not changed significantly between sampling intervals. In this incremental updating approach, the statistic may first be determined from an initial sampled dataset, and then the statistic may be incrementally updated using other sampled datasets, such that the statistic is based on the initial sampled dataset and one or more sampled datasets that follow the initial sampled dataset in time. This approach allows the unique value count to be estimated using a sample size that is larger than the sample size for any one sampling interval, thereby improving the unique value count estimation and improving the resulting query execution plan.

Referring to FIG. 1, as a more specific example, in accordance with some implementations, a database system 100 includes a query optimizer 110, which, based on statistics provided by an incremental statistical estimator 170, provides a query execution plan that is executed by a query executor 120. In particular, the incremental statistical estimator 170, in accordance with example implementations, estimates unique value counts for corresponding attributes (attributes corresponding to table columns, for example) that are targeted by a query 106. As an example, the incremental statistical estimator 170 may apply an LWC estimator based on the $f_i$ statistic for purposes of generating a given unique count estimate. The he unique value count estimates provided by the incremental statistical estimator 170 are used by the query optimizer 110 to determine a query execution plan for the query executor 120. More specifically, in accordance with example implementations, based on the unique value count estimates for attribute(s) that are identified by the query 106, the query optimizer 110 generates a query tree of operators that instructs the query executor 120 regarding how to execute the query 106. The query tree may, for example, specify the particular operators that are used in the execution of the query and the order in which these operators are applied. As a more specific example, a given query 106 may involve multiple join operations, and for the execution of the query 106, the query optimizer 110 may determine the order in which to join database tables based at least in part on the unique value count estimates for one or multiple attribute(s) identified by the query 106. As another example, the query optimizer 110 may generate a tree of operators directing how database items are reordered and/or grouped based at least in part on unique value count estimates for one or multiple attributes that are identified by the query 106.

As depicted in FIG. 1, in this manner, the query 106 may be received and parsed by a parser 104, which provides the parsed components to the query executor 120 that executes the query plan for purposes of retrieving information from a data store 150 and providing corresponding query results 124.

As depicted in FIG. 1, the data store 150 includes tables 154. In general, a given table 154 includes columns of attributes (sales, zip codes, and so forth). A sampler 160 of the query engine 110 regularly (periodically, for example) samples the tables 154 to provide corresponding sample datasets 164. A given sample dataset 164 refers to a sample (called "S" herein) of a table, or $S \subseteq T$. As an example, the cardinality |S| may be the minimum of 1,000,000 and one percent of |T|. The sample datasets 164 include a sampled dataset 164 representing an initial observation, or sample (denoted by "$S_0$"), of the table, as well as subsequent samples ($S_1, S_2 \ldots S_k$), where "k" denotes the sample period. The incremental statistical estimator 170, in accordance with example implementations, accesses these samples as the samples become available. In this manner, for purposes of "accessing" the samples, the statistical estimator 170 may receive data representing the samples, read data from a memory, and so forth.

In accordance with example implementations, the incremental statistical estimator 170, based on the initial sample dataset $S_0$, estimates a unique value count for groups of one or more columns of the table T. In accordance with example, the columns of the table are organized into histogram bins, or intervals (fifty intervals, as an example), where each interval is associated with one or multiple columns of the table T. More specifically, in accordance with example implementations, the incremental statistical estimator 170 constructs an equal height histogram, i.e., partitions the intervals so that unique entry value count for each interval is the same or nearly the same. This means that a given interval may be associated with one or multiple columns of the table T. The incremental statistical estimator 170 may use different criteria to determine the partitions, in accordance with further example implementations.

For each interval, the incremental statistical estimator 170 determines the $f_i$ statistic for the interval based on the initial sample dataset $S_0$. Using the $f_i$ statistics, the incremental statistical estimator 170 estimates the unique value counts for the intervals.

Over time, the sampler 160 provides multiple sampled datasets 164 (corresponding to samples $S_1, S_2, S_3, S_4$, and so forth), which are associated with different corresponding sampling periods. As each sampled dataset becomes available, the incremental statistical estimator 170 determines a degree of change in the sampled datasets. In this context, determining a "degree of change" refers to quantitatively characterizing how the datasets are different, if at all, from each other. For specific implementations that are described herein, the statistical estimator evaluates, how much, if any, the distributions of the unique value counts of the sampled datasets vary for purposes of determining the degree of change. As described below, in accordance with example implementation, the incremental statistical estimator 170 may determine the degree of change between two sampled datasets by determining the change in skewness $\gamma$ in the distribution of the unique value counts in the datasets. However, other statistical measures may be employed to determine the degree of change between two sampled datasets, in accordance with further, example implementations. The incremental statistical estimator 170 determines, based on the degree that the underlying data distribution has changed, whether the $f_i$ statistic for a given interval can be incrementally updated with the dataset (so that the $f_i$ statistic is based on multiple datasets 164) or determined solely from the newest dataset 164.

In accordance with example implementations, the incremental statistical estimator 170 determines the degree in which the underlying data distribution changes from one sampled dataset 164 to the next by determining a change in a skewness $\gamma$ in the distribution of the unique value count. For example, for a given interval, the incremental statistical estimator 170 may determine the change in skewness $\gamma$ between the $S_0$ and $S_1$ samples. In particular, in accordance with example implementations, the incremental statistical estimator 170 observes the change in skewness $\gamma$ by observing the distribution of $f_i(S_0)$ and $f_i(S_1)$ from the $S_0$ and $S_1$ samples, respectively. The change is denoted herein as "$\Delta f_i$" and may be described as follows:

$$\Delta f_i = f_i(S_0) - f_i(S_1). \qquad \text{Eq. 1}$$

The change in $\Delta f_i$ is a measure of the change in skewness $\gamma$ in the distribution of the unique value count. Statistically, the $\Delta f_i$ change is given by a test of hypothesis: $\Delta f_i = 0$ versus the hypothesis $\Delta f_i \neq 0$. More specifically, in accordance with example implementations, the incremental statistical estimator 170 evaluates the following test statistic (called "$T_{(stat)}$") as follows:

$$T_{(stat)} = \frac{\overline{f_i(S_0)} - \overline{f_i(S_1)}}{\sigma_i}, \qquad \text{Eq. 2}$$

where "$\overline{f_i(S_0)}$" represents the average of the $f_i(S_0)$ frequency; "$\overline{f_i(S_1)}$" represents the average of the $f_i(S_1)$ frequency; and "$\sigma_i$" represents the standard deviation of the differences. A small value for of $T_{(stat)}$ indicates no relatively small change in skewness between the $S_0$ and $S_1$ samples, and a large value for $T_{(stat)}$ indicates that there is a relatively large change in the distribution of the unique entry count. Evaluating the $T_{(stat)}$ test statistic is an example of one way the incremental statistical estimator 170 may compare a skew associated with a given sampled dataset to a skew associated with another sampled dataset, in accordance with an example implementations. In general, the incremental statistical estimator 170 may compare skews by evaluating how one skew differs from another.

In accordance with example implementations, the incremental statistical estimator 170 calculates the magnitude of the differences of Eq. 2 using 95% confidence limits from a probability distribution. In this manner, in accordance with example implementations, if the magnitude of the differences is within the 95% confidence limits, then the incremental statistical estimator 170 deems the data distribution as not changing (i.e., deems that the data distribution change is acceptably small) from the $S_0$ to $S_1$ samples. The incremental statistical estimator 170 may use other confidence limits and, in general, may employ other ways to assess the degree in which data distribution has changed, in accordance with further implementations.

In response to determining that the data distribution has not changed for a given interval or changed by a degree below a predetermined threshold, the incremental statistical estimator 170 may then incrementally update the $f_i$ statistic for that interval and by combining the $S_0$ to $S_1$ samples.

In general, as long as there is relatively little to no change in $\Delta f_i$, the incremental statistical estimator 170 accumulates the sample data according to $\cup S_i$, where i=0, 1, 2, . . . , k. In this context, "accumulates" means to aggregate or otherwise combine the sample data. When the incremental statistical estimator 170 determines that there is, as evaluated by the skewness test, a change between the $(k-1)^{th}$ and $k^{th}$ periods, the incremental statistical estimator 170 stops the accumulation and estimates the $f_i$ statistic from the current $S_i$ sample dataset. It is noted that the incremental statistical estimator 170 applies the estimation at the histogram intervals: for those intervals where a change in skewness is observed, the incremental statistical estimator 170 solely uses the current $S_i$ sample to estimate the unique entry count, while for the other intervals where skewness was unchanged, the multiple samples are combined for this estimation.

Figure 2:
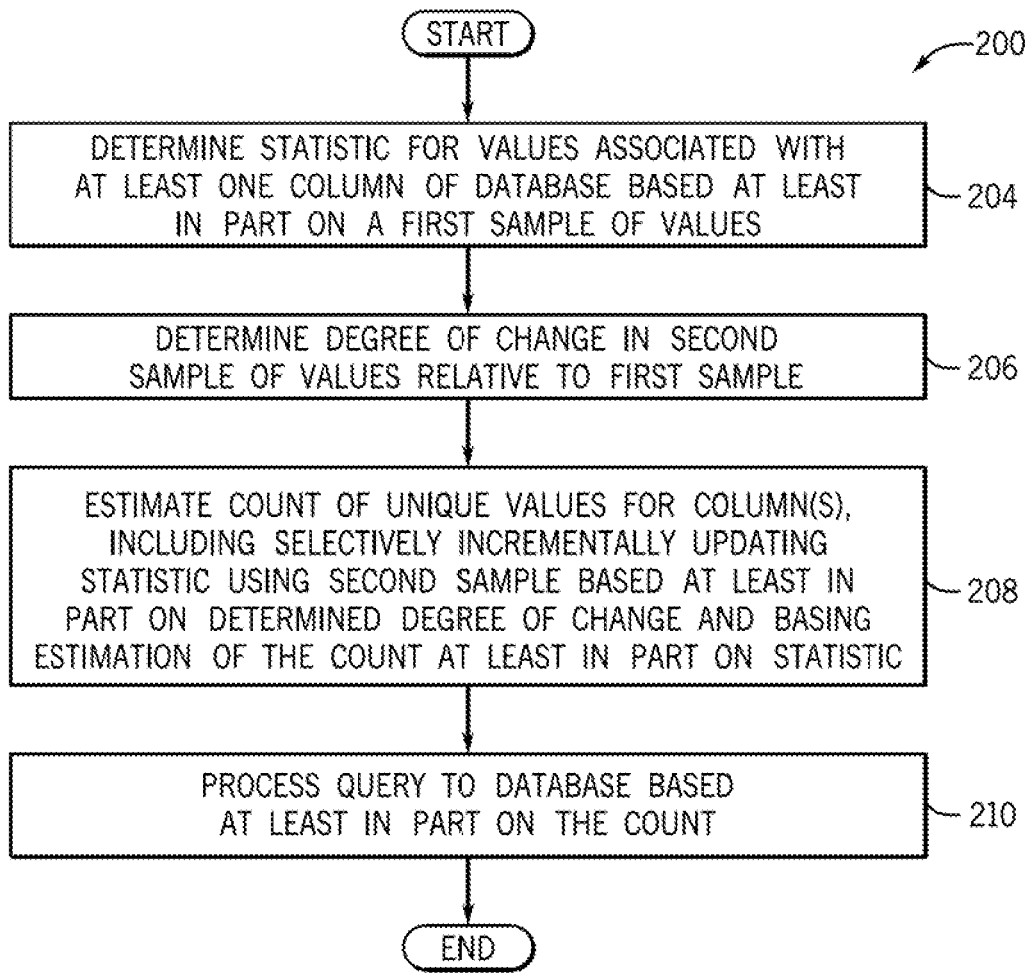
FIGS. 2 and 3 are flow diagrams depicting techniques to incrementally update statistics used for query processing according to example implementations.

Thus, referring to FIG. 2 in conjunction with FIG. 1, in accordance with example implementations, a technique 200 includes determining (block 204) a statistic for values associated with at least one column of a database based at least in part on a first sample of the values; and determining (block 206) a degree of change (determining a change skewness, for example) in a second sample of the values relative to the first sample. Pursuant to block 208, the technique 200 includes estimating a count of unique values for the column(s). The estimation of the count of unique values includes selectively incrementally updating the statistic using the second sample based at least in part on the determined degree of change; and basing estimation of the count at least in part on the updated statistic. In accordance with example implementations, "selectively incrementing updating the statistic" refers to process in which either 1.) the statistic is incrementally updated by updating or adding to the first sample (underlying a current version of the statistic) to produce a new version of the statistic; or 2.) the statistic is not incrementally updated, but rather, the first sample is discarded and replaced by new data to produce the new version of the statistic. The selection between option 1.) or 2.) is made based on the determined degree of change in the second sample relative to the first sample. The technique 200 further includes processing a query to the database based at least in part on the count, pursuant to block 210. In this manner, pursuant to block 210, a query execution plan may be developed based on the unique value counts (such as the above-described plan generated by the query optimizer 110), and the query execution plan may then be executed (such as by the query executor 120) to provide the query results 124.

In accordance with example implementations, in addition to considering whether the data distribution has changed, the incremental statistical estimator 170 also considers whether a given table row appears in more than one sampled dataset $S_0, S_1, \ldots S_k$, as simple random sampling with replacement may be used. In accordance with example implementations, the incremental statistical estimator 170 incorporates a probability calculation to determine the likelihood of a repeated appearance of observations in the $S_i$ dataset, where i=0, 1, 2, . . . , k.

Figure 3:
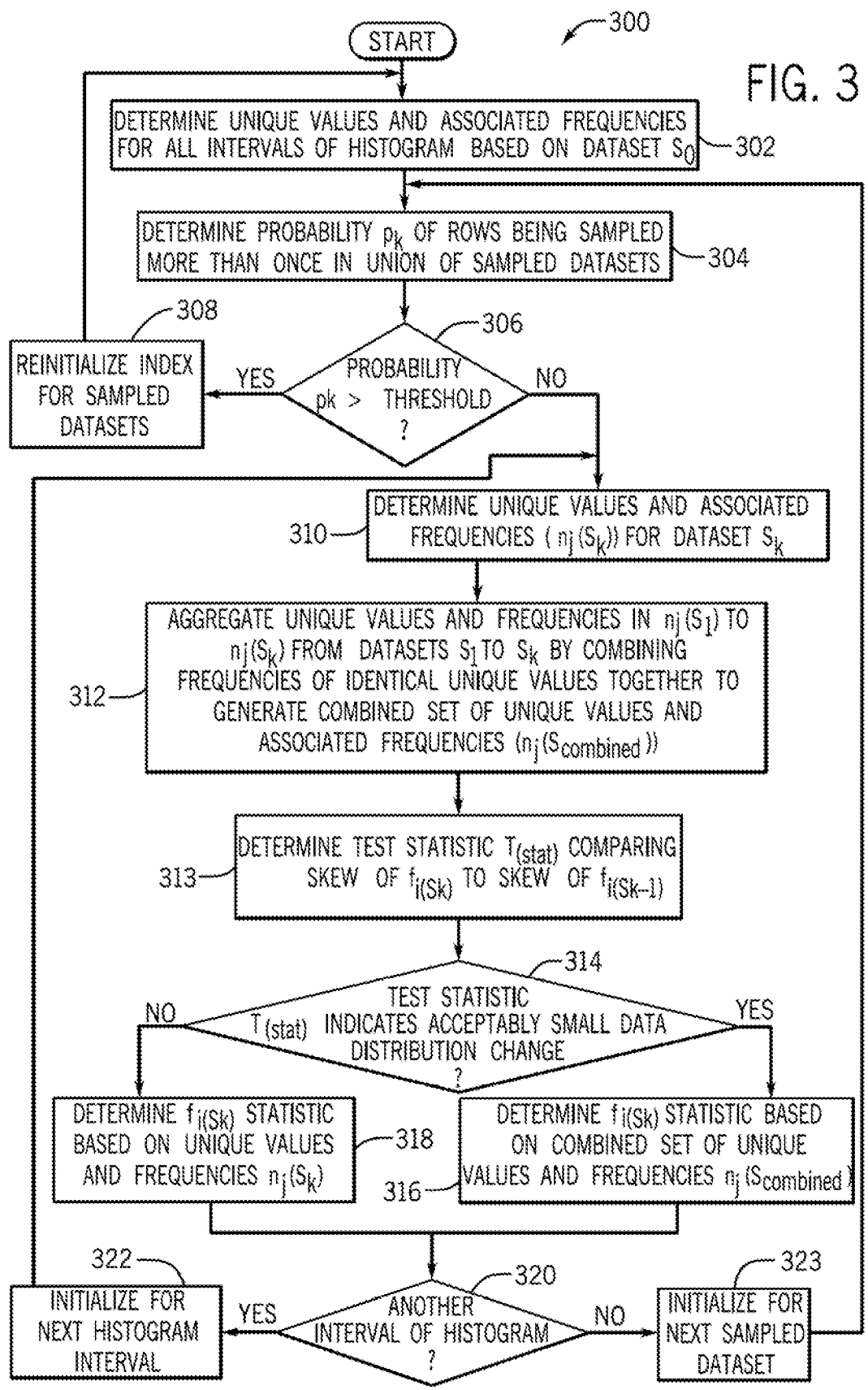

Referring to FIG. 3 in conjunction with FIG. 1, a technique 300 in accordance with example implementations includes first determining unique values and associated frequencies for all of the histogram intervals based on the initial dataset $S_0$ (i.e., the dataset acquired in the initial sampling period) In this manner, pursuant to block 302, the unique values and frequencies in the $S_0$ dataset are determined (called "$n_j(S_0)$") and saved.

Next, pursuant to the technique 300, an iterative process begins to selectively incrementally refresh the statistics at the $k^{th}$ sample (i.e., the sample associated with the $k^{th}$ sampling period). As depicted in block 304, the incremental statistical estimator 170 determines (block 304) a probability $p_k$ of rows being sampled more than once in the sampled union of datasets (where the union is $\cup S_i = S_0 \cup S_1 \cup \ldots S_k$). Pursuant to decision block 306, the incremental statistical estimator 170 determines whether the probability $p_k$ is greater than a predefined threshold. In other words, the incremental statistical estimator 170 determines whether there is a significant likelihood that rows have been sampled more than once in the datasets $S_0$ to $S_k$. If so, the incremental statistical estimator 170 reinitializes the index for the datasets, pursuant to block 308, and control returns to block 302. In this manner, in accordance with example implementations, the k index is set back to 0. Otherwise, the incremental statistical estimator 170 partitions the samples according to non-overlapping histogram intervals and begins an iterative process to update the $f_i$ statistic for each interval.

More specifically, in accordance with example implementations, for the next interval, the incremental statistical estimator 170 determines (block 310) the unique values and frequencies $n_j(S_k)$ for the portion of the dataset $S_k$ corresponding to the interval. Next, the statistical estimator combines, or aggregates (block 312), the unique value and frequencies $n_j(S_i)$ to $n_j(S_k)$ for the portions of the datasets $S_1$ to $S_k$ corresponding to the interval by combining the frequency of identical unique keys together to generate combined set of unique values and frequencies $n_j(S_{combined})$.

The incremental statistical estimator 170 then determines (block 313) the test statistic $T_{(stat)}$ for the interval, which compares the skewness of distribution of $f_i(S_k)$ to the skewness of distribution of $f_i(S_{k-1})$. If, pursuant to decision block 314, the $T_{(stat)}$ statistic indicates an acceptably small data distribution change, then the incremental statistical estimator 170 determines (block 316) the $f_i(S_k)$ statistic for the interval based on the combined set of unique values and frequencies $n_j(S_{combined})$. Otherwise, the incremental statistical estimator 170 determines the $f_i(S_k)$ statistic for the interval based on the set of unique values and frequencies of the current dataset, or $n_j(S_k)$ (i.e., determines the $f_i(S_k)$ statistic associated with the most recent sampling period) pursuant to block 318.

The incremental statistical estimator 170 then determines (diamond 320) whether another histogram interval is to be processed, and if so, the incremental statistical estimator 170 initializes (block 322) for the next histogram interval and control returns to block 310 to process the next interval. Otherwise, the incremental statistical estimator 170 initializes (block 323) to process the next sampled dataset and control returns to block 304.

Figure 4:
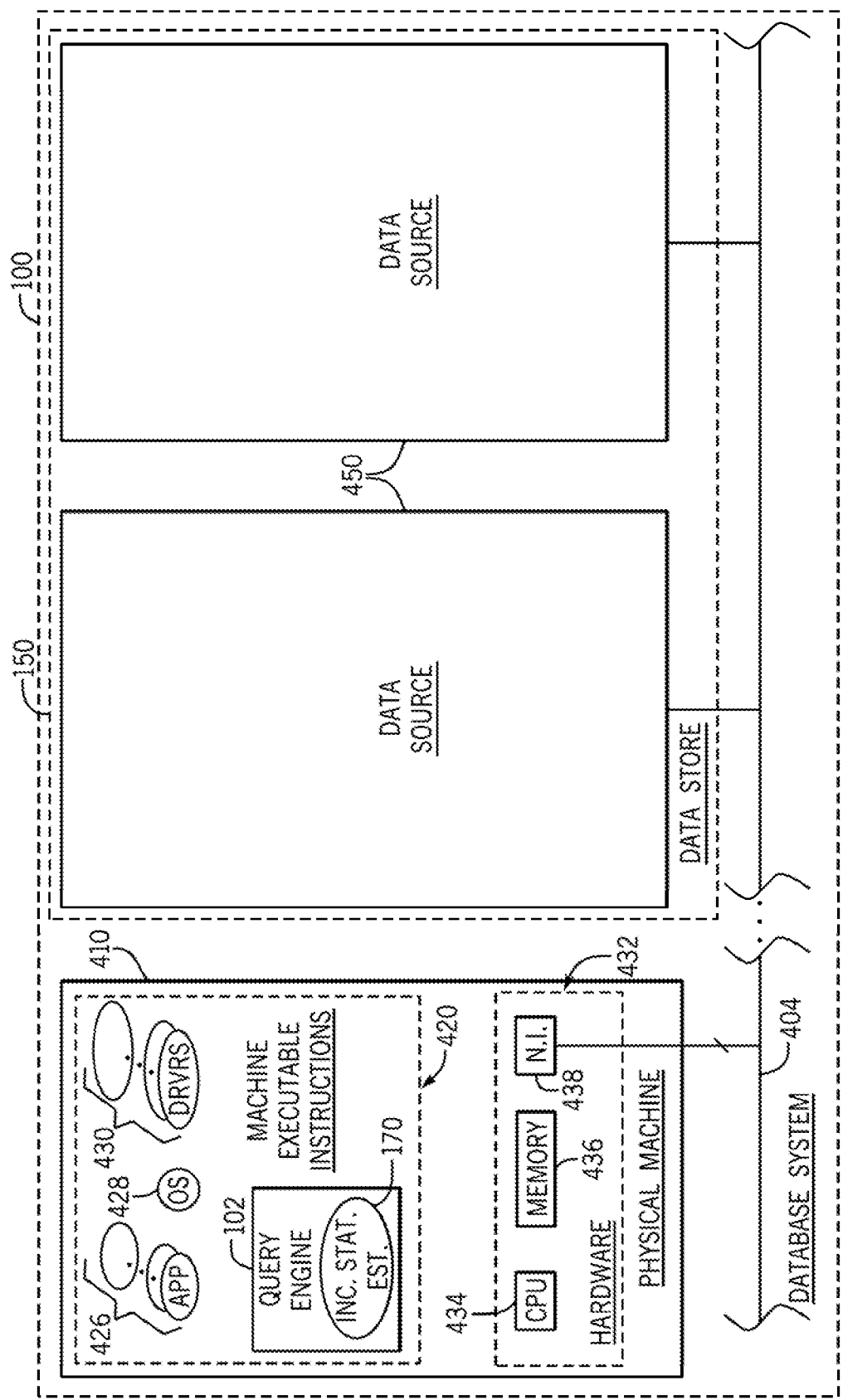

Referring to FIG. 4 in conjunction with FIG. 1, as a non-limiting example, the that database system 100 may include one or multiple physical machines 410. In this context, a "physical machine" indicates that the machine is an actual machine made up of executable program instructions and hardware. Examples of physical machines include computers (e.g., application servers, storage servers, web servers, etc.), communications modules (e.g., switches, routers, etc.) and other types of machines. The physical machine(s) may be located within one cabinet (or rack); or alternatively, the physical machine(s) may be located in multiple cabinets (or racks).

As depicted in FIG. 4, the physical machines 410 may be interconnected by a network 404 to one or multiple data sources 450 (which collectively form the data store 150 of FIG. 1, for example). Examples of the network 404 include a local area network (LAN), a wide area network (WAN), the Internet, or any other type of communications link. The network 404 may also include system buses or other fast interconnects.

In accordance with a specific example described herein, the physical machine 410 of FIG. 4 may contain machine executable program instructions 420 (or "software") and hardware 432 that executes the instructions 420 for purposes of forming the query engine 100 to perform one or more parts of the techniques 200 and/or 300. Although FIG. 4 depicts the physical machine 410 as being separate from the source(s) 450, the physical machine 410 may include a data source, in accordance with other example implementations. Thus, many variations are contemplated and are within the scope of the appended claims.

It is noted that in other implementations, the architecture that is used to process queries may include additional physical machines in addition to the physical machine 410 that is depicted in FIG. 4. Thus, all or part of the query engine 110 may be implemented on a single physical machine or on more than two physical machines, depending on the particular implementation.

The architecture that is depicted in FIG. 4 may be implemented in an application server, a storage server farm (or storage area network), a web server farm, a switch or router farm, other type of data center, and so forth. Additionally, although the physical machine 410 is depicted in FIG. 4 as being contained within a box, it is noted that a physical machine, in accordance with further example implementations, may be a distributed machine having multiple nodes, which provide a distributed and parallel processing system.

As depicted in FIG. 4, in accordance with some implementations, the machine executable instructions 420 may include one or multiple applications 426, an operating system 428 and one or multiple device drivers 430 (which may be part of the operating system 428). In general, the machine executable instructions 420 are stored in storage, such as in a memory 436 of the physical machine 410. In general, the machine executable instructions 420 may be stored in a non-transitory medium or non-transitory media, such as in system memory, in a semiconductor memory, in removable storage media, in optical storage, in magnetic storage, in non-removable storage media, in storage separate (local or remote) from the physical machine 410, etc., depending on the particular implementation.

The hardware 432 may include one or multiple processors that execute the machine executable instructions 420, such as one or multiple central processing unit (CPUs) 434 (one CPU 34 being depicted in FIG. 1 for purposes of a non-limiting example), or one or multiple processing cores of the CPU(s) 434. The hardware 432 may include additional components, such as a network interface 438, input devices, and so forth.

Thus, in accordance with example implementations, one, multiple or all of the components of the query engine 102 (see FIG. 1), such as the incremental statistical estimator 170, for example, may be software components, i.e., a component formed by at least one processor executing machine executable instructions, or software. In further example implementations, one, multiple or all of these components may be constructed as a hardware component that is formed from dedicated hardware (one or more integrated circuits that contain logic that is configured to perform sampling, statistical analysis, query planning, query execution, and so forth). Thus, the components of the query engine 102, which are described herein may take one of many different forms and may be based on software and/or hardware, depending on the particular implementation.

While the present techniques have been described with respect to a number of embodiments, it will be appreciated that numerous modifications and variations may be applicable therefrom. It is intended that the appended claims cover all such modifications and variations as fall within the scope of the present techniques.

What is claimed is:

1. A non-transitory computer readable storage medium storing instructions that, when executed by a computer, cause the computer to:

access a plurality of datasets sampled from a column of a database at different times;

compare a first skew associated with a first dataset of the plurality of datasets to a second skew associated with a second dataset of the plurality of datasets, based on a comparison of a first value for a statistic derived from the first dataset with a second value for the statistic derived from the second dataset, wherein the first skew or the second skew is a degree of change in a respective dataset;

based on the comparison of the first skew to the second skew, selectively combine a subset of data from the first dataset and a subset of data from the second dataset to provide a combined subset of data;

use the combined subset of data to determine a third value for the statistic;

based on the comparison of the first skew to the second skew, use the second value or the third value for the statistic to estimate a count of unique values in the column of the database;

receive a query to retrieve data from the database;

generate an execution plan for the query based on the count of unique values in the column; and execute the query based on the execution plan to provide query results.

2. The non-transitory computer readable storage medium of claim 1, wherein the instructions, when executed by the computer, further cause the computer to apply a linear weighted combination estimator to estimate the count of unique values using the second value or the third value for the statistic.

3. The non-transitory computer readable storage medium of claim 1, wherein the statistic comprises a frequency of unique values appearing in the column.

4. The non-transitory computer readable storage medium of claim 1, wherein, to generate the execution plan for the query, the instructions further cause the computer to perform selecting operators and selecting an operator execution order for the query based on the count of unique values in the column.

5. The non-transitory computer readable storage medium of claim 1, wherein the instructions, when executed by the computer, further cause the computer to determine a probability of rows of the database being sampled more than once among at least two datasets of the plurality of datasets and further base selective combination of the subsets of data from the first and second datasets based on the probability.

6. A system comprising:
at least one hardware processor; and
a memory storing instructions that when executed cause the at least one hardware processor to:
access a plurality of datasets sampled from a column of a database, each dataset of the plurality of datasets being associated with a different sampling period of a plurality of sampling periods;
compare a first degree of change associated with a first dataset of the plurality of datasets to a second degree of change associated with a second dataset of the plurality of datasets based on a comparison of a first value for a statistic derived from the first dataset with a second value for the statistic derived from the second dataset;
based on the comparison of the first decree of change to the second degree of change, selectively combine a subset of data from the first dataset and a subset of data from the second dataset to provide a combined subset of data;
use the combined subset of data to determine a third value for the statistic;
based on the comparison, use the second value or the third value for the statistic to estimate a count of unique values in the column of the database;
receive a query to retrieve data from the database;
generate an execution plan for the query based on the count of unique values in the column; and
execute the query based on the execution plan to provide query results.

7. The system of claim 6, wherein: the statistic comprises a frequency of unique values appearing in the column; and the instructions, when executed, cause the at least one hardware processor to: determine a first value for the frequency of unique values appearing in the column based on the first dataset, and determine a second value for the frequency of unique values appearing in the column based on the second dataset;
determine a difference between the first and second values;
determine a standard deviation for the frequency of unique values appearing in the column based on the difference between the first and second values; and
determine degree of change based on the first value, the second value and the standard deviation.

8. The system of claim 6, wherein the instructions, when executed, cause the at least one hardware processor to:
determine a probability of data entries of the database being sampled more than once in multiple datasets of the plurality of datasets, and
in response to the probability, discard the combined subset of data and generate the third value for the statistic based on the subset of data from the second dataset which is associated with a most recent sampling period.

9. The system of claim 6, wherein the instructions, when executed, cause the at least one hardware processor to apply a linear weighted combination estimator to estimate the count of unique values in the column using the second value or the third value for the statistic.

10. The system of claim 6, wherein the statistic indicates a frequency of unique values appearing in the column.

11. A method comprising:
accessing, by a processor, a plurality of datasets sampled from a column of a database at different times;
comparing, by the processor, a first skew associated with a first dataset of the plurality of datasets to a second skew associated with a second dataset of the plurality of datasets, based on a comparison of a first value for a statistic derived from the first dataset with a second value for the statistic derived from the second dataset, wherein the first skew or the second skew is a degree of change in a respective dataset;
based on the comparison of the first skew to the second skew, selectively combining, by the processor, subsets of data from the first dataset and from the second dataset of the plurality of datasets to provide a combined subset of data;
using, by the processor, the combined subset of data to determine a third value for the statistic;
based on the comparison of the first skew to the second skew, using, by the processor, the second value or the third value for the statistic to estimate a count of unique values associated with the column;
receiving a query to retrieve data from the database;
generating, by the processor, an execution plan for the query based on the count of unique values in the column; and
executing, by the processor, the query based on the execution plan to provide query results.

12. The method of claim 11, further comprising applying a linear weighted combination estimator to estimate the count of unique values in the column using the second value or the third value for the statistic.

13. The method of claim 11, wherein the statistic indicates a frequency of unique values appearing in the column.

14. The method of claim 11, wherein generating the execution plan for the query comprises selecting operators and selecting an operator execution order for the query based on the count of unique values in the column.

15. The method of claim 11, further comprising determining a probability of rows of the database being sampled more than once among at least two datasets of the plurality of datasets and further selectively combining the subset of data from the first dataset and the subset of data from the second dataset based on the probability.

* * * * *